United States Patent [19]

Lang

[11] 4,087,309
[45] May 2, 1978

[54] APPARATUS FOR SEALING LAP JOINTS OF FUSIBLE ROOFING SHEETS

[76] Inventor: John N. Lang, 46 Allpark Ave., Pittsburgh, Pa. 15216

[21] Appl. No.: 776,301

[22] Filed: Mar. 10, 1977

[51] Int. Cl.² .................. B32B 31/26; B65H 69/08
[52] U.S. Cl. ............................ 156/497; 156/82; 156/157; 156/499; 156/578; 156/579
[58] Field of Search .............. 156/82, 157, 304, 306, 156/320, 322, 497, 499, 544, 547, 574, 576, 578, 579

[56] References Cited

U.S. PATENT DOCUMENTS

| | | | |
|---|---|---|---|
| 2,084,625 | 6/1937 | Stebbins et al. | 156/499 |
| 2,664,938 | 1/1954 | Torr | 156/578 |
| 3,097,986 | 7/1963 | Kaver | 156/497 |
| 3,099,582 | 7/1963 | Ongstad et al. | 156/578 |
| 3,135,430 | 6/1964 | Caldwell | 156/578 |
| 3,166,458 | 1/1965 | Chinn et al. | 156/304 |

*Primary Examiner*—Caleb Weston
*Attorney, Agent, or Firm*—Brown, Murray, Flick & Peckham

[57] ABSTRACT

A burner that has flat upper and lower walls connected by side walls and a front end wall is provided with a fuel inlet for connection to a fuel source and with an open rear end. A device is connected to one side of the burner for inserting it between the overlapping layers of a lap joint of fusible roofing sheets for sliding it forward along the joint while flame issues from the rear end of the burner to fuse the overlapping layers together. Preferably, a roller follows the burner to press the hot layers of the joint together. A second burner may be provided which is opposite hand to the first burner and which is held in an elevated position as long as the first burner is in operating position.

12 Claims, 9 Drawing Figures

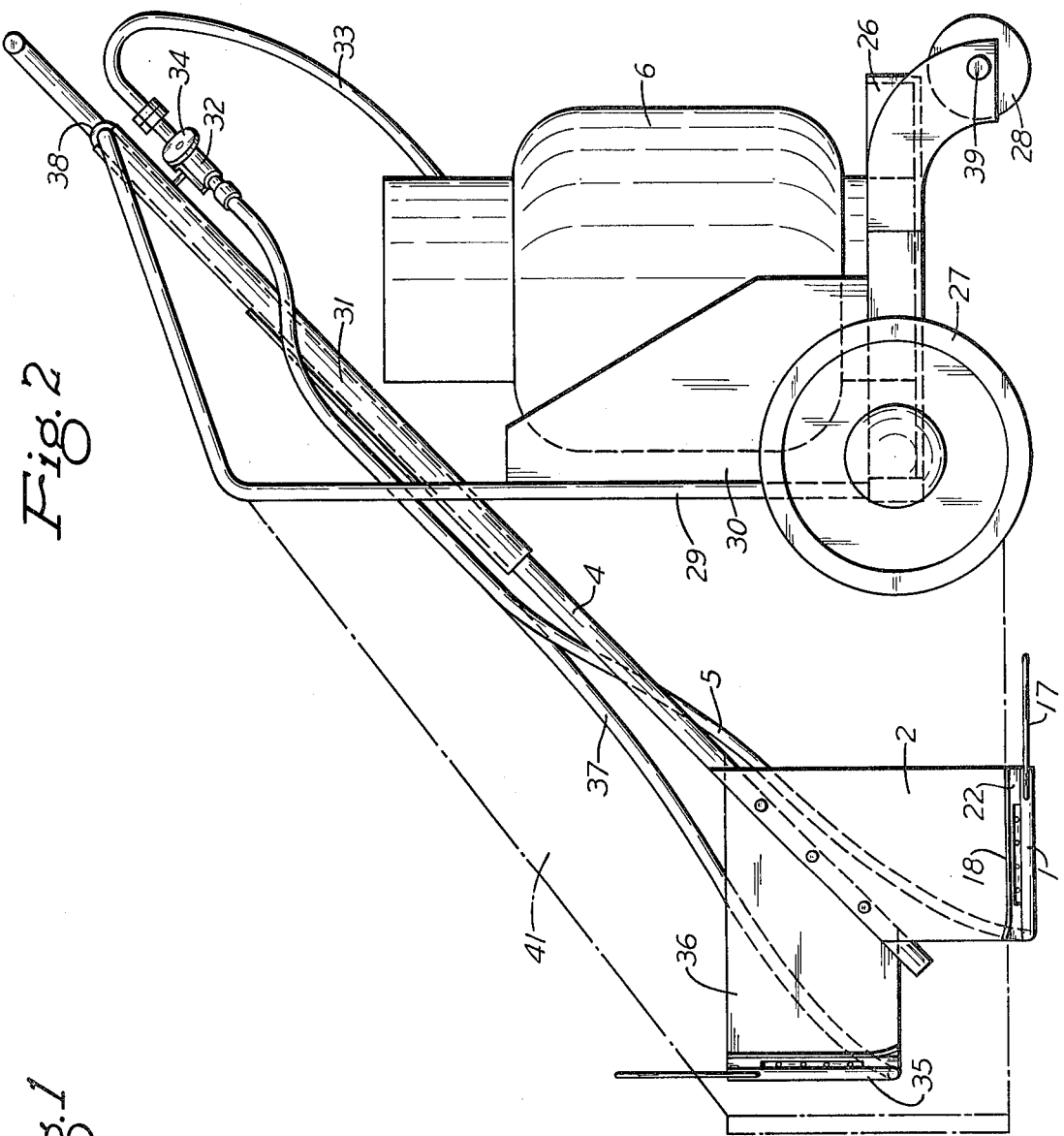

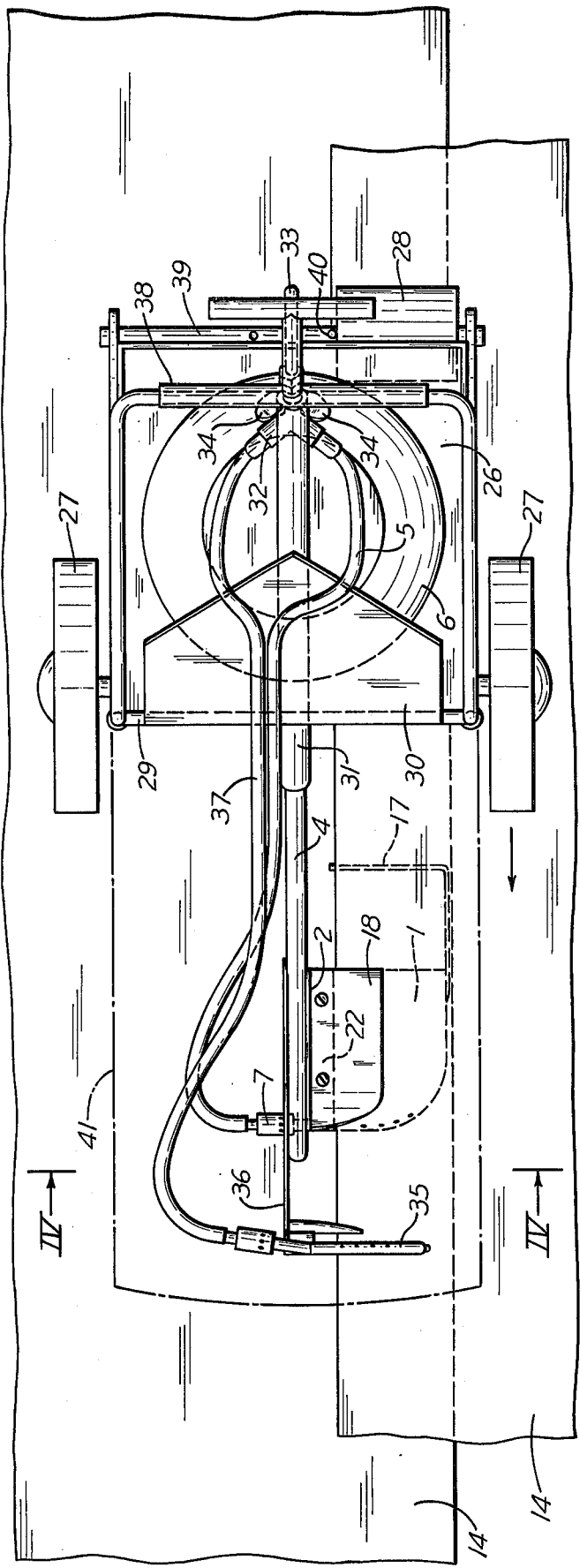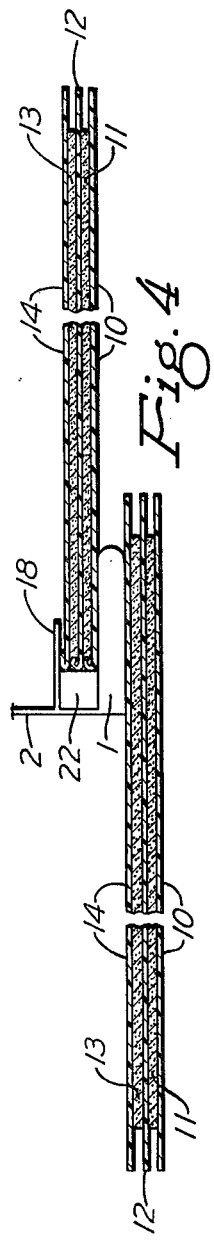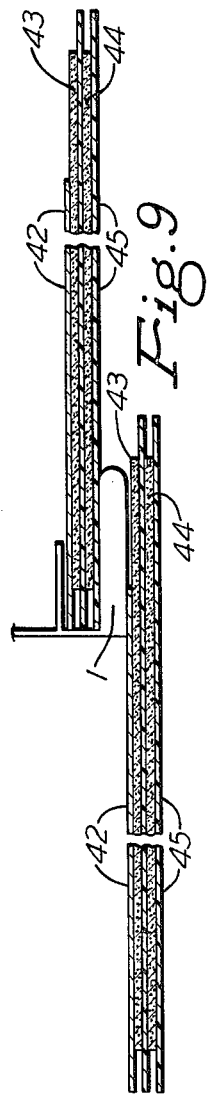

APPARATUS FOR SEALING LAP JOINTS OF FUSIBLE ROOFING SHEETS

One type of roofing sheet, sometimes referred to as a membrane, is formed from a bottom strip of nonflamable plastic on which there is a coating of a fusible composition containing asphalt. Another plastic strip covers the composition coating and supports another coating of the composition material. Covering this upper coating is a third sheet, which may be a plastic strip or a thin strip of aluminum. These roofing sheets are laid down on a supporting roof structure with the edges of the sheets overlapping one another a few inches to form lap joints. One way of sealing the lap joints is to fuse their adjoining surfaces together by means of heat, but a more reliable and an economical way of doing this has been a problem.

It is an object of this invention to provide for sealing the lap joints of fusible roofing sheets in a manner which is rapid, dependable and economical.

The preferred embodiment of the invention is illustrated in the accompanying drawings, in which FIG. 1 is a front view;

FIG. 2 is a side view;

FIG. 3 is a plan view;

FIG. 4 is a vertical section taken on the line IV—IV of FIG. 3, but with the thickness of the roofing sheets exaggerated;

FIG. 9 is a view like FIG. 4, but showing different roofing sheets.

Figure 7:
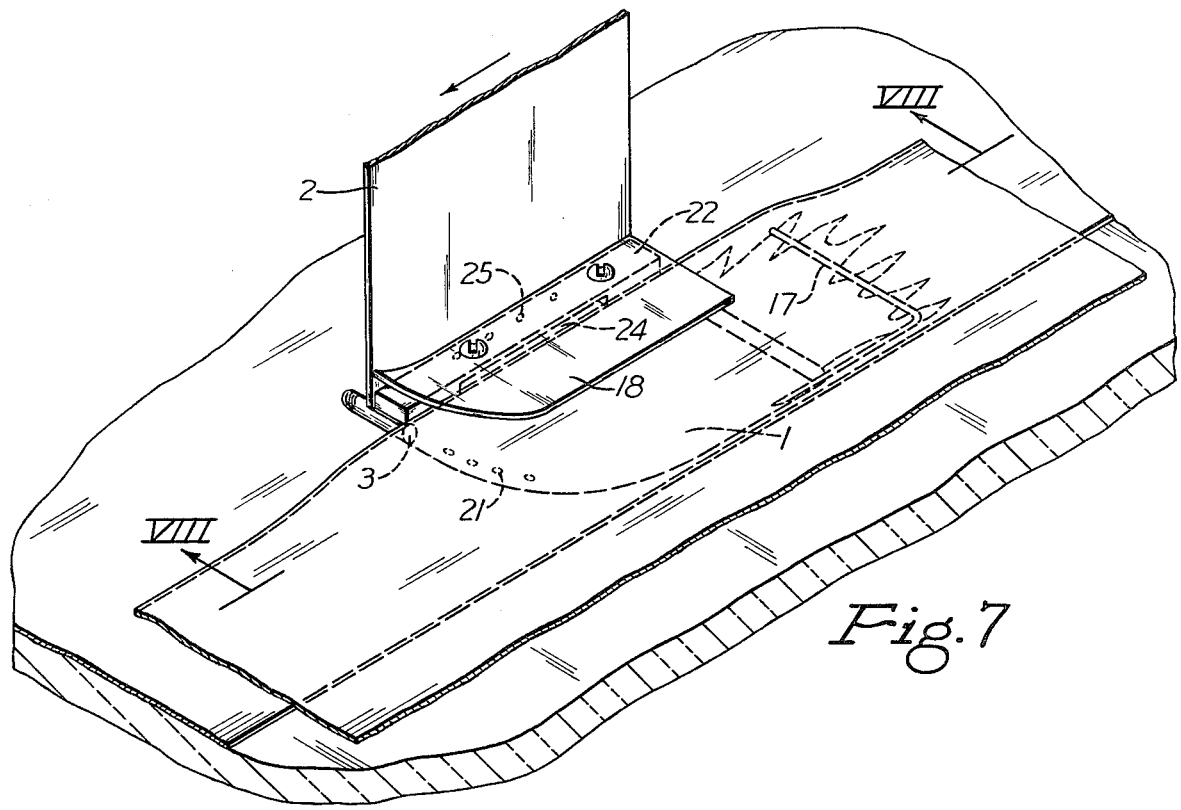
FIG. 7 is a perspective view showing the burner in operating position.

Referring to the drawings, a flat burner 1 is formed with substantially flat, heavy upper and lower walls connected by side walls and a rounded front end wall. The rear end of the burner is open. One side of the burner is joined to the lower edge of a vertical plate 2, which may be an integral extension of the upper wall of the burner. Below this plate there is a fuel inlet 3 in the side of the burner, preferably near its front end. The front corner of the burner opposite the inlet is curved to eliminate a sharp corner that might possibly damage the roofing sheets with which it is used. As shown in FIGS. 1, 2 and 3, the upper part of the vertical plate is connected to the lower end of a shaft 4 that serves as a support and handle for the burner. The shaft is inclined upwardly and rearwardly from the burner, preferably at about a 45° angle. The fuel inlet is connected by a hose 5 to a source of fuel, such as a tank 6 of propane gas. The hose contains an air inlet member 7 to supply oxygen to the gas.

Figure 8:
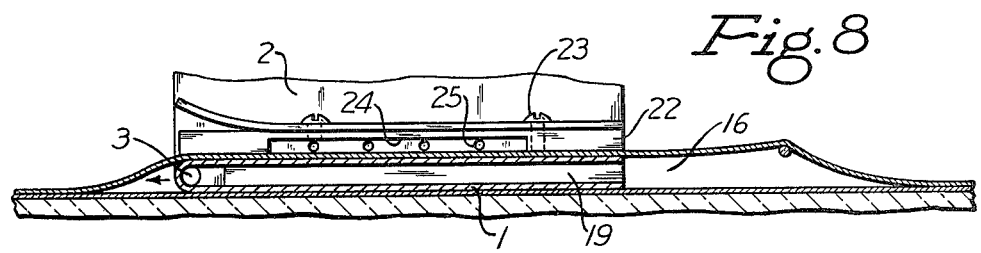
FIG. 8 is a vertical section taken on the line VIII—VIII of FIG. 7.

This apparatus is used by an operator walking behind shaft 4 who inserts the burner is between the two layers of the lap joint by sliding or swinging the free side of the burner laterally into the joint. When in place, the burner rests flat on the lower sheet as shown in FIGS. 7 and 8. As shown in FIG. 4, each roofing sheet may include a bottom strip 10 several feet wide, of nonflammable plastic film, a coating 11 of a fusible waterproof composition containing asphalt and covering the strip, another strip 12 of plastic film like the bottom strip laid on top of the composition coating, a second coating 13 of the composition covering the second strip, and a covering strip 14 of plastic film like the other two strips on top of the upper composition coating. The three plastic strips project from the opposite edges of the composition coatings a short distance. The material of which the plastic strips are made is subject to being consumed by high temperatures, but does not flame up.

With the burner in place in a lap joint and ignited and a flame issuing from its rear end between the layers of the joint as shown in FIGS. 3, 7 and 8, the operator slides the burner forward along the joint from one end to the other. This movement of the burner necessarily separates the joint layers by raising the upper layer, thereby providing a gap 16 (FIG. 8) several inches long directly behind the burner before the upper layer settles back down onto the lower layer. As the burner is moved forward, the gap progresses forward with it. It is into this gap that the burner flame issues. As the burner moves ahead, its hot upper and lower walls preheat the areas of the sheets engaging them and then these preheated areas are heated to a much higher temperature by the flame in the traveling gap. This temperature is sufficient to burn away the overlapping areas of the plastic strips that form the top and bottom of the gap, and to fuse together behind the gap the upper composition coating 13 in the lower layer of the joint and the lower composition coating 11 in the upper layer. By a roller or the like following the burner directly behind the flame gap, the two layers are pressed securely together to form a good seal between the two fused coatings just mentioned. It generally is desirable to extend a rod 17 rearwardly from one side of the burner and then across the burner a few inches behind it to ensure that the heated upper layer will not sag down over the burner outlet and choke out the flame.

For best results, a hold-down plate 18 is disposed above the upper wall of the burner to keep the upper layer of the lap joint from rising too far away from the burner, as it might do under some weather conditions. This plate is secured to vertical plate 2 and extends from it part way across the burner. The front end of the hold-down plate should be curved upwardly to prevent damage to the roofing sheet, and the free side edge also may be curved upwardly if desired to facilitate insertion of the burner into the lap joint.

To help distribute the flame across the full width of the burner outlet, there may be a partition wall 19 inside the burner extending forward from the outlet to a point near the front end of the burner. This wall will deflect some of the incoming gas rearwardly through the space between it and the inlet side of the burner. It also is desirable to provide some flame jets near the more exposed free edge of the upper layer of the lap joint. This can be done by drilling a line of holes 20 in the upper wall of the burner between the vertical plate and the partition wall.

A further line of holes 21 may be drilled in the burner where its upper wall joins its front wall. When the fuel needs more oxygen, air will be drawn into the burner through these holes. The rest of the time flame jets will issue from them to help preheat the lap joint as the burner is moved ahead.

Figures 5, 6:
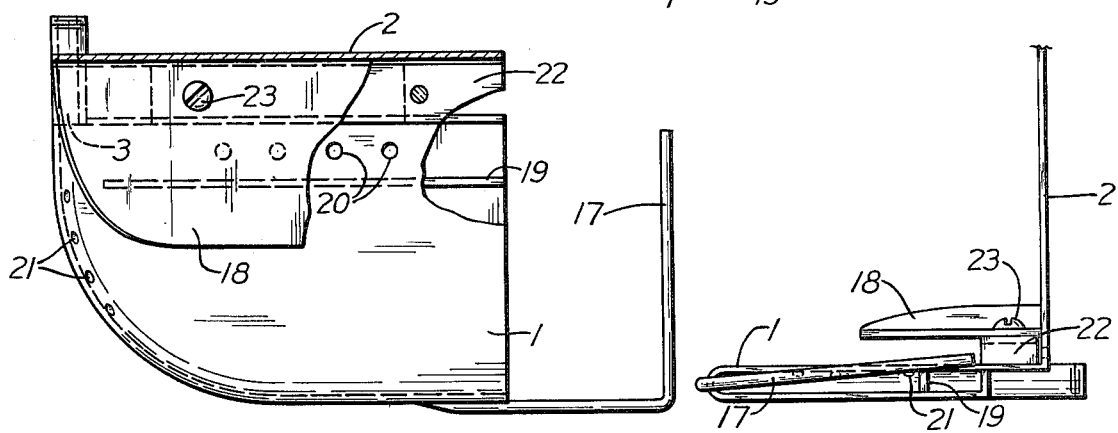
FIG. 5 is an enlarged plan view of a burner, partly broken away.
FIG. 6 is a rear view of the burner.

It will be seen in FIG. 6 that the extension of the upper wall of the burner that forms vertical plate 2 first extends horizontally away from the underlying side wall of the burner a short distance. The space between this horizontal extension and hold-down plate 18 is filled by a filler block 22 that is held in place by removable fasteners 23. As the burner is pushed along the lap joint, this block slides along the edge of the upper layer of the joint, crumpling the projecting edges of the plastic strip as it goes. Under some conditions, which will be explained later, the filler block is removed. The bottom of the block is received at 24, and vertical plate 2 is provided with a plurality of holes 25 that open into the recess. Air can enter these holes and pass through the block recess to aid combustion at holes 20 in the top of the burner.

Although this burner apparatus can be carried by a man, it is more practical to include a carriage with it and to mount the burner on the carriage. As shown in FIGS. 1, 2 and 3, the carriage may have a base 26 supported at its front end by a pair of wheels 27, and at its rear end by a roller 28 resting on the lap joint. Extending upwardly from the base is a frame 29 that includes a rearwardly extending handle at its upper end for pushing the carriage. A vertical shield 30 is secured to the frame in front of the base and extends back along its sides. The frame also supports an inclined sleeve 31, in which shaft 4 is rotatably and slidably mounted. The upper part of the sleeve supports a Y-shape coupling 32, the inlet of which is connected by a hose 33 to the fuel tank. One branch of the coupling is connected to hose 5 leading to the burner. Both branches include shut off valves 34.

Another feature of this invention is that there are two burners, one for a right-hand lap joint and one for a left-hand lap, so that after one burner has traveled the length of a given joint the carriage can be turned around and the other burner inserted in the next joint for a return trip. Accordingly, a second burner 35 like burner 1 is connected by a vertical plate 36 to shaft 4. This second burner is connected by a hose 37 to one branch of coupling 32. The positions of the two burners are such that when burner 1 is in operating position as shown, plate 36 will extend forward from the shaft and support burner 35 on edge several inches above the roofing sheets, with both burners extending in the same direction from their supporting plates. When the shaft is turned 180°, burner 35 will swing around and down into operating position while the other burner will be swung up above the roofing sheets. When neither burner is operating, shaft 4 can be pulled up in the sleeve to lift both burners away from the roof. Although the positions of the two burners relative to each other preferably are as shown, their supporting plates could be other than in parallel planes. It is desirable to provide shaft 4 with a cross bar 38 that engages the carriage handle when either burner is in its lowest position. Preferably, the bar is curved transversely to fit part way around the handle. When a man is pushing the carriage, he grips the bar and handle simultaneously, which prevents the shaft from being pushed up in sleeve 31 by an uneven area of the roofing.

Since it is likely that there will be some oozing of the composition material out of the edge of the lap joint, which would stick to roller 27 if it extended entirely across the carriage, it is desirable to make the roller short enough so that it will not extend beyond the edge of the joint being rolled. Then, when the carriage is turned around to travel in the opposite direction, the roller is moved over to the opposite end of its supporting shaft 39, where it can be held by a removable pin 40 extending through a hole near the center of that shaft.

If desired, a wind shield 41 shown in dotted lines in FIGS. 2 and 3, may be attached to the carriage frame and extend forward around the burners.

The roofing sheets shown in FIG. 9 have top strips 42 that are aluminum foil instead of plastic. Unlike the plastic strips, the aluminum does not project beyond both edges of the underlying composition coatings 43 and 44, but at one edge of the sheet terminates a distance from that edge about equal to the width of the lap joint. The burner consumes the overlying area of the bottom plastic strip 45 of the upper layer of the lap joint and fuses the lower coating 44 of that layer to the exposed area of the upper coating 43 of the bottom layer. Also, with such roofing sheets, filler block 22 is removed to permit the projecting edge of the aluminum strip on top of the joint to continue to project so that it can be pressed down against the lower sheet after the lap joint has been sealed.

The joint sealing apparatus disclosed herein provides a relatively rapid and dependable way of effectively sealing the lap joints of fusible roofing sheets. Only one man is required for operating the apparatus.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for sealing lap joints of fusible roofing sheets, said apparatus comprising a burner having substantially flat upper and lower walls connected by side walls and a front end wall, the burner having a fuel inlet and an open rear end, a conduit for connecting said inlet to a fuel source, and means connected to one side of the burner for inserting it between the overlapping layers of a lap joint and for sliding it forward along the joint while flame heats said upper and lower walls and issues from the rear end of the burner to fuse said overlapping layers together, said fuel inlet being located in the front end of the bruner side wall at said one side of the burner.

2. Apparatus for sealing lap joints according to claim 1, including a hold-down plate rigidly mounted above said burner for engaging the upper surface of the upper layer of a lap joint.

3. Apparatus for sealing lap joints according to claim 1, including a rod behind the burner and supported by it and extending across it, the rod being spaced from the open rear end of the burner.

4. Apparatus for sealing lap joints according to claim 1, in which the upper wall of the burner is provided with a row of flame ports extending from front to back close to said one side.

5. Apparatus for sealing lap joints according to claim 1, in which said inserting means include a substantially vertical supporting member extending upwardly above said burner upper wall from said one side of the burner, and a shaft secured to said member and extending upwardly and rearwardly therefrom to form a handle for the burner.

6. Apparatus for sealing lap joints according to claim 5, including a hold-down plate projecting from said vertical supporting member over the burner for engaging the upper surface of the upper layer of a lap joint, said vertical member being offset laterally away from the burner a predetermined distance, and a filler block removably mounted between said hold-down plate and the burner in the area between the burner and the vertical supporting member.

7. Apparatus for sealing lap joints according to claim 5, including a second burner like the first-mentioned burner, and a second supporting member connecting the second burner with said shaft for supporting the second burner in an elevated position while the first burner is in operating position, said shaft being manually rotatable to swing the first burner up out of operative position and simultaneously swing the second burner down into operating position, the first burner extending laterally in one direction from its supporting member when in operating position, and the second burner extending laterally in the opposite direction from its supporting member when in operating position.

8. Apparatus for sealing lap joints according to claim 1, including a carriage behind the burner provided with a support for a fuel tank for the burner, means supported by the carriage and extending forward therefrom for supporting the burner, and a roller rotatably mounted in the carriage for engaging the upper surface of the upper layer of a lap joint to press it down against the lower layer of the joint as the carriage is moved forward.

9. Apparatus for sealing lap joints according to claim 8, including a rod behind the burner and supported by it and extending across it in front of said roller to support the upper layer of a lap joint, the rod being spaced from the open rear end of the burner.

10. Apparatus for sealing lap joints according to claim 8, in which said supporting means include a sleeve rigidly mounted on the carriage and inclined forward and downward, a shaft extending through the sleeve and rotatable therein manually, and means connecting the lower end of the shaft with said burner.

11. Apparatus for sealing lap joints according to claim 10, including a second burner like the first-mentioned burner, means connecting the lower end of said shaft with the second burner and supporting it in an elevated position while the first burner is in operating position, manual rotation of the shaft serving to swing the first burner up out of operating position and simultaneously swing the second burner down into operating position, the first burner extending laterally in one direction from the shaft when in operating position and the second burner extending laterally in the opposite direction from the shaft when in operating position.

12. Apparatus for sealing lap joints according to claim 11, in which said shaft is slidable upwardly in said sleeve to elevate both burners above the roofing sheets.

* * * * *